US012156837B2

(12) United States Patent
Moore et al.

(10) Patent No.: US 12,156,837 B2

(45) Date of Patent: Dec. 3, 2024

(54) WHEELCHAIRS AND METHODS FOR ADJUSTING OR MAINTAINING A WHEELCHAIR USER'S CENTER OF GRAVITY

(71) Applicant: TOYOTA MOTOR NORTH AMERICA, INC., Plano, TX (US)

(72) Inventors: Douglas A. Moore, Fairview, TX (US); Dario S. Villarreal Suarez, Farmers Branch, TX (US)

(73) Assignee: Toyota Motor North America, Inc., Plano, TX (US)

( * ) Notice: Subject to any disclaimer, the term of this patent is extended or adjusted under 35 U.S.C. 154(b) by 1113 days.

(21) Appl. No.: 16/930,400

(22) Filed: Jul. 16, 2020

(65) Prior Publication Data

US 2022/0015967 A1 Jan. 20, 2022

(51) Int. Cl.
*A61G 5/10* (2006.01)

(52) U.S. Cl.
CPC ........... *A61G 5/104* (2013.01); *A61G 5/1089* (2016.11); *A61G 5/1051* (2016.11); *A61G 2203/10* (2013.01); *A61G 2203/36* (2013.01); *A61G 2203/42* (2013.01)

(58) Field of Classification Search
CPC .... A61G 5/104; A61G 4/1051; A61G 5/1056; A61G 5/1089; A61G 2203/10; A61G 2203/36; A61G 2203/42
USPC ............................................ 280/304.1, 250.1
See application file for complete search history.

(56) References Cited

U.S. PATENT DOCUMENTS

| | | | | |
|---|---|---|---|---|
| 6,202,773 | B1 | 3/2001 | Richey et al. | |
| 7,974,753 | B2 | 7/2011 | Kuo et al. | |
| 2017/0189250 | A1 | 7/2017 | Juhasz | |
| 2019/0231617 | A1* | 8/2019 | Cazali | A61G 5/068 |

FOREIGN PATENT DOCUMENTS

| | | | | |
|---|---|---|---|---|
| CN | 203493840 U | | 3/2014 | |
| CN | 107647981 A | | 2/2018 | |
| CN | 107928899 A | * | 4/2018 | A61G 5/061 |
| CN | 107233168 B | | 5/2018 | |
| CN | 107757793 B | | 3/2019 | |
| CN | 210158811 U | | 3/2020 | |
| JP | 2017213189 A | | 12/2017 | |
| KR | 101269876 B1 | | 5/2013 | |

* cited by examiner

*Primary Examiner* — Tony H Winner
*Assistant Examiner* — Felicia L. Brittman-Alabi
(74) *Attorney, Agent, or Firm* — Dinsmore & Shohl LLP

(57) ABSTRACT

A wheelchair includes a seat, a first adjustable leg coupled to a first side of the seat, a second adjustable leg coupled to a second side of the seat, one or more turning sensors, and a control unit. The first adjustable leg includes a first leg actuator configured to extend and retract the first adjustable leg. The second adjustable leg includes a second leg actuator configured to extend and retract the second adjustable leg. The one or more turning sensors are configured to output a turning signal indicative of the wheelchair performing a turning motion. The control unit is operable to determine the wheelchair is performing the turning motion based on the turning signal, and automatically adjust a tilt angle of the seat with the first leg actuator and the second leg actuator to lean a user of the wheelchair into the turning motion.

20 Claims, 6 Drawing Sheets

WHEELCHAIRS AND METHODS FOR ADJUSTING OR MAINTAINING A WHEELCHAIR USER'S CENTER OF GRAVITY

TECHNICAL FIELD

The present specification generally relates to wheelchairs and methods and, more specifically, wheelchairs and methods for adjusting and/or maintaining a wheelchair user's center of gravity.

BACKGROUND

Powered wheelchairs may generally be navigated by a user manipulating a joystick or similar user interface device. Oftentimes as a user traverses a curve or performs another turning movement, the user's center of gravity may shift from the center of the seat. Additionally, as a user traverses an uneven surface, the user's center of gravity may shift. The shifting of a user's center of gravity may be uncomfortable for a user or may result in turnover of the wheelchair.

Accordingly, a need exists for wheelchairs and methods for adjusting or maintaining a user's center of gravity in the wheelchair.

SUMMARY

In one embodiment, a wheelchair includes a seat, a first adjustable leg coupled to a first side of the seat, a second adjustable leg coupled to a second side of the seat, one or more turning sensors, and a control unit. The first adjustable leg includes a first leg actuator configured to extend and retract the first adjustable leg. The second adjustable leg includes a second leg actuator configured to extend and retract the second adjustable leg. The one or more turning sensors are configured to output a turning signal indicative of the wheelchair performing a turning motion. The control unit is operable to determine the wheelchair is performing the turning motion based on the turning signal output by the one or more turning sensors, and automatically adjust a tilt angle of the seat with the first leg actuator and the second leg actuator to lean a user of the wheelchair into the turning motion.

In another embodiment, a wheelchair includes a seat, a first adjustable leg coupled to first side of the seat, a second adjustable leg coupled to a second side of the seat, one or more user posture sensors, and a control unit. The first adjustable leg includes a first leg actuator configured to extend and retract the first adjustable leg. The second adjustable leg includes a second leg actuator configured to extend and retract the second adjustable leg. The one or more user posture sensors are configured to output a posture signal indicative of a posture of a user positioned on the seat. The control unit is configured to determine a location of a center of gravity of the user based on the posture signal output by the one or more user posture sensors, and automatically adjust a tilt angle of the seat with the first leg actuator and the second leg actuator to maintain the center of gravity of the user at a predetermined position.

In yet another embodiment, a method for maintaining a wheelchair user's center of gravity at a predetermined position is included. The method includes receiving, with a control unit, a posture signal from one or more posture sensors, the posture signal being indicative of a posture of a user positioned on a seat of a wheelchair; determining, with the control unit, a location of a center of gravity of the user based on the posture signal; and adjusting, automatically with the control unit, one or more actuators to adjust a tilt angle of the seat to maintain the center of gravity of the user at the predetermined position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to wheelchairs and methods for adjusting and/or maintaining a user's center of gravity in the wheelchair. For example, when a wheelchair is making a turning motion, centrifugal forces may act on a user's body to shift the user's center of gravity into an uncomfortable position. The shifting of a user's center of gravity may also result in overturning of a wheelchair. Traveling over rough and/or uneven terrain may cause similar shifting of the user's center of gravity. The present embodiments are configured to detect the user's shifting center of gravity and/or detect a turning motion of the wheelchair and automatically adjust the angle of the seat of the wheelchair to prevent and/or limit shifting of the user's center of gravity. Moreover, some users may prefer postures where their center of gravity is elsewhere than the center of the seat (e.g., leaning forward, reclining, leaning to one side or the other, etc., the wheelchair may maintain the user's desired center of gravity positioning, thereby allowing the user to maintain his or her desired posture. Various embodiments of wheelchairs and methods will be described in more detail herein.

Figure 1:
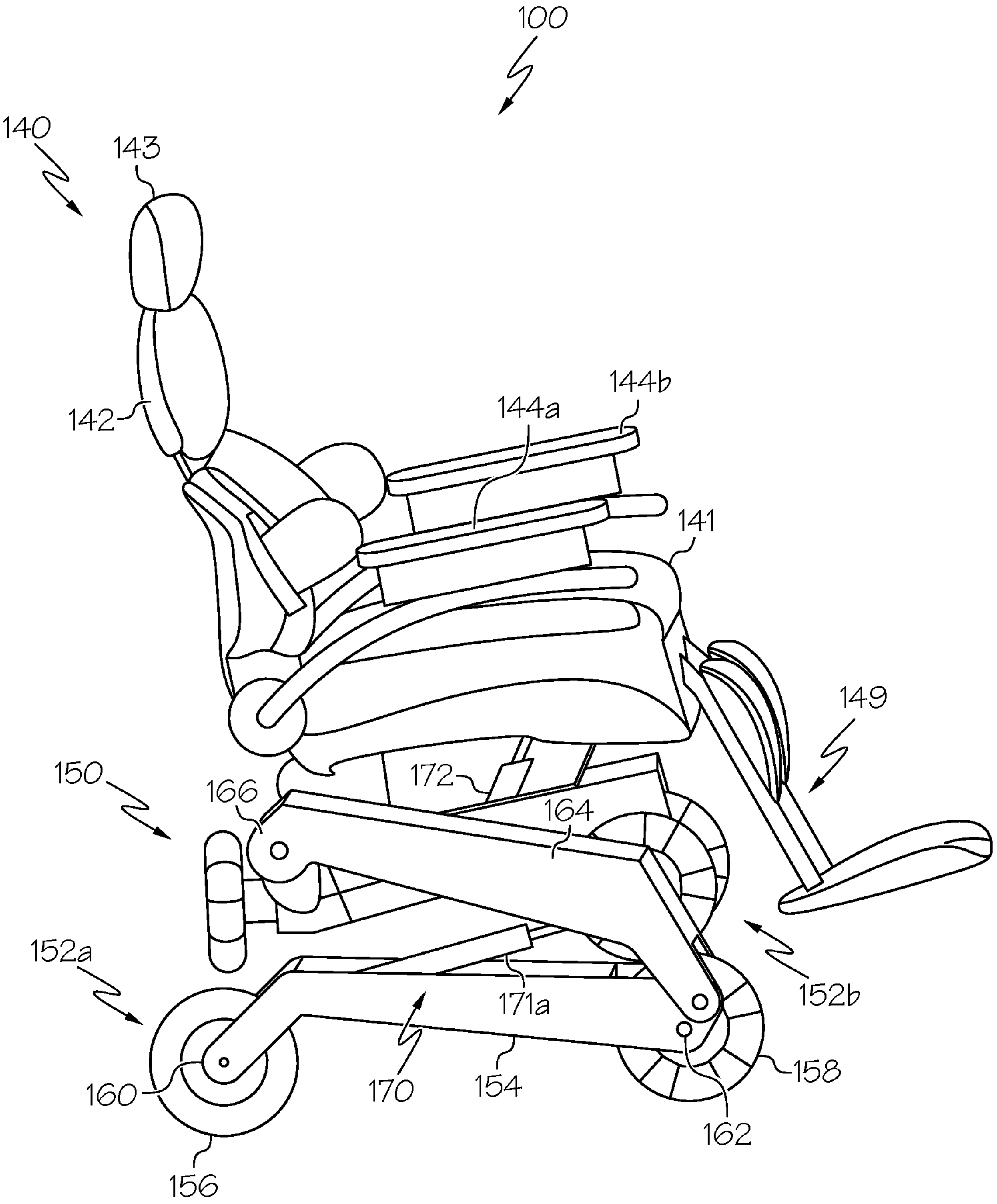
FIG. 1 depicts a side view of a wheelchair configured to adjust and/or maintain a user's center of gravity within the wheelchair, according to one or more embodiments shown and described herein.

Referring now to FIG. 1, an example wheelchair 100, e.g., a power wheelchair, is generally depicted. The wheelchair 100 includes a seat 140 configured to support a user 200 (depicted in FIG. 3A). The seat includes a seat portion 141 and may further include a backrest 142 a headrest 143, right and left arm rests 144*a*, 144*b*, and/or a lower leg and foot rest 149.

Attached to the seat 140 may be the powered wheelchair base 150. The powered wheelchair base 150 may include a first adjustable leg 152*a* coupled to a first side of the seat 140 and a second adjustable leg 152*b* coupled to the second side of the seat 140, shown in FIG. 3A-3C. Each of the first adjustable leg 152*a* and the second adjustable leg 152*b* may be pivotally coupled to the seat portion 141 such that the angle of the seat 140 may be tilted in the forward and aft position (e.g., within the XZ plane of the depicted coordinate axes). Each adjustable leg 152*a*, 152*b* may be substantially identical to one another and may include one or more wheels, e.g., powered via a motor, not shown. For example, and with reference to FIG. 1, each adjustable leg 152*a*, 152*b* includes a lower leg linkage 154 to which a first wheel 156 and a second wheel 158 are pivotally coupled such that the first and second wheels 156, 158 may rotate to move the wheelchair 100 across a surface. The first wheel 156 may be coupled to a distal end 160 of the lower leg linkage 154 while the second wheel 158 is coupled to a proximal end 162 of the lower leg linkage 154. The lower leg linkage 154 may be pivotally coupled to an upper leg linkage 164 at the proximal end 162 of the lower leg linkage 154. A proximal end 166 of the upper leg linkage 164 may be pivotally coupled to the seat 140.

One or more actuators 170 may be configured to move the upper leg linkage 164 relative to the lower leg linkage 154 about the proximal end 162 of the lower leg linkage 154. For example, the one or more actuators 170 may include a first leg actuator 171*a* configured to extend and retract the first adjustable leg 152*a* and a second leg actuator 171*b*, schematically illustrated in FIG. 2, configured to extend and retract the second leg actuator 171*b*. Operation of the first leg actuator 171*a* and the second leg action 171*b* may tilt the seat 140 side to side. The one or more actuators 170 may also be configured to tilt the seat 140 in the forward and aft direction and/or side to side. For example, a seat actuator 172 may be configured and positioned to tilt the seat 140 in the forward or after direction. The seat actuator 172 may include multiple seat actuators configured to adjust the forward and aft positions of the seat portion 141, the backrest 142, the headrest 143, the right and left arm rests 144*a*, 144*b*, and/or the lower leg and foot rest 149. The one or more actuators 170 may include any combination of linear or rotational actuators, configured to adjust the angle of the seat 140 in the side to side and/or the forward to aft directions.

Figure 2:
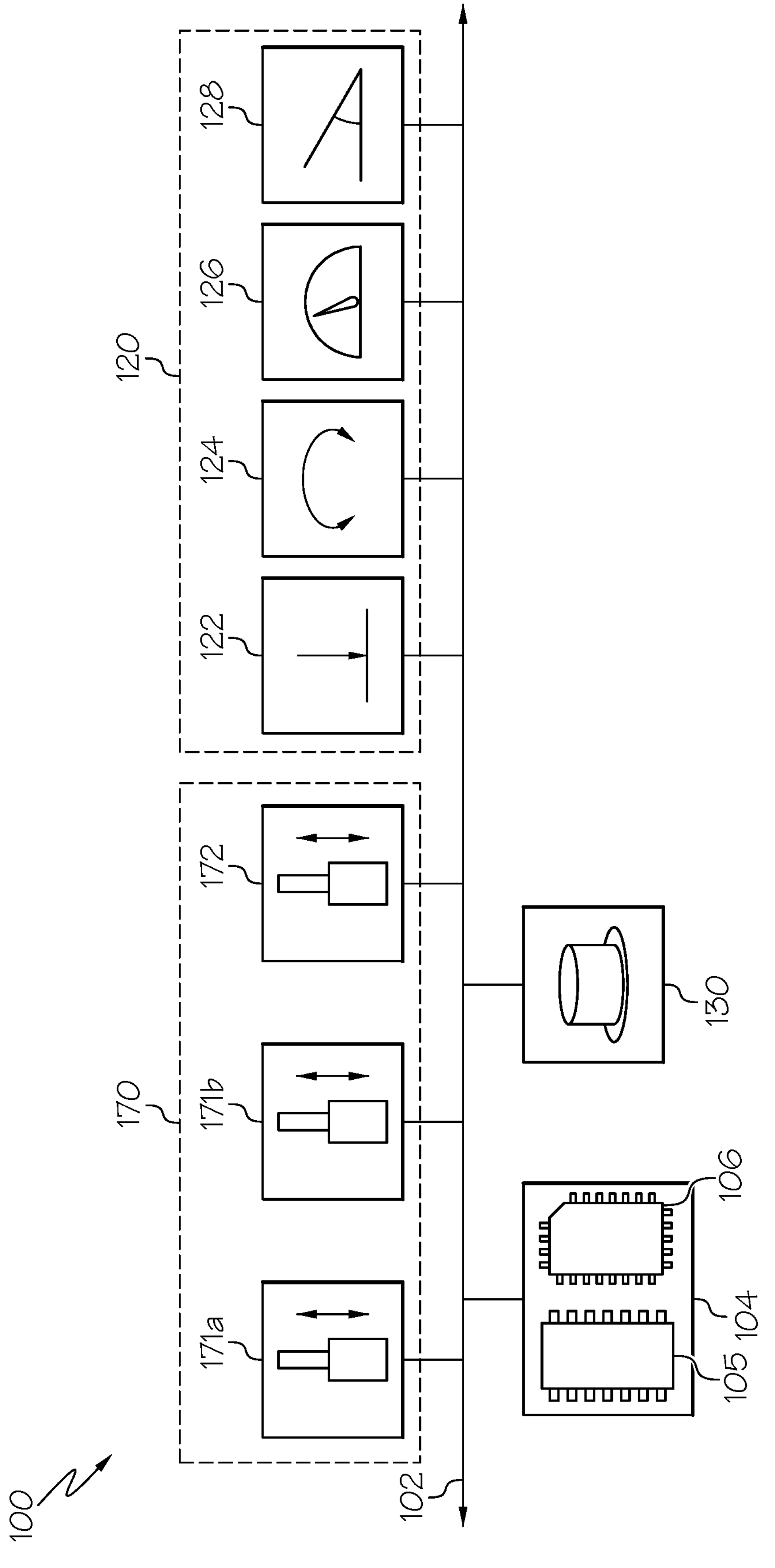
FIG. 2 schematically illustrates various communicatively coupled modules of the wheelchair of FIG. 1, according to one or more embodiments shown and described herein.

FIG. 2 schematically illustrates various modules of a wheelchair 100 according to one or more embodiments shown and described herein. A fewer or greater number of modules may be included without departing from the scope of the present disclosure. Generally, the wheelchair 100 may include a communication path 102, a control unit 104, a first leg actuator 171*a*, a second leg actuator 171*b*, a seat actuator 172, one or more posture sensors 120, which may include one or more force sensors 122, one or more turning sensors 124, one or motion sensors 126, one or more tilt sensors 128, and/or any other sensors which may output a signal indicative of a position of a user's center of gravity, and one or more user interface devices 130.

The communication path 102 provides data interconnectivity between various modules disposed within the wheelchair 100. Specifically, each of the modules can operate as a node that may send and/or receive data. In some embodiments, the communication path 102 includes a conductive material that permits the transmission of electrical data signals to and between processors, memories, sensors, actuators, etc. throughout the wheelchair 100. In another embodiment, the communication path 102 can be a bus, such as for example a LIN bus, a CAN bus, a VAN bus, and the like. In further embodiments, the communication path 102 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The control unit 104 may be configured to selectively operate components of the wheelchair 100. For example, the control unit 104 may control the first and second leg actuators 171*a*, 171*b* and the seat actuator 172, to selectively tilt (e.g., side to side and/or front to back) the seat 140 of the wheelchair 100 to adjust and/or maintain a user's center of gravity at or in a predetermined position. For example, the electronic control unit 104 may include one or more processors 105 and one or more memory modules 106. The one or more processors 105 may include any device capable of executing machine-readable instructions stored on a non-transitory computer-readable medium. Accordingly, each processor may include a controller, an integrated circuit, a microchip, a computer, and/or any other computing device. It is noted that the one or more processors 105 may reside within the wheelchair 100 and/or external to the wheelchair 100.

The one or more memory modules 106 are communicatively coupled to the one or more processors 105 over the communication path 102. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the wheelchair 100 and/or external to the wheelchair 100.

Embodiments of the present disclosure include logic stored on the one or more memory modules 106 that includes machine-readable instructions and/or an algorithm written in any programming language of any generation (e.g., 1GL, 2GL, 3GL, 4GL, and/or 5GL) such as, machine language that may be directly executed by the one or more processors 105, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail herein, logic stored on the one or more memory modules 106 allows the electronic control unit 104 to, for example, to detect that the user's center of gravity has and/or will shift, and control the various actuators to adjust a tilt angle of the seat 140 to maintain and/or adjust a user's center of gravity.

The first and second leg actuators 171*a*, 171*b* and the seat actuator 172 may be communicatively coupled to the control unit 104 over the communication path 102. As will be described below, the control unit 104 may execute logic to control a position of the first and second leg actuators 171*a*, 171*b*, and/or the seat actuator 172 to maintain and or adjust a user's posture or center of gravity within the chair. Each actuator may be independently and selectively operated to adjust the seat 140 of the wheelchair 100.

The one or more posture sensors 120 are communicatively coupled to the control unit 104 over the communication path 102. The one or more posture sensors 120 may include any sensors configured to output a posture signal indicative of a posture of a user within a seat 140. For example, the one or more posture sensors 120 may indicate the location of a center of gravity of the user within the seat 140 and/or changes to the location of the center of gravity of the user within the seat 140. The one or more posture sensors 120 may include, but are not limited to one or more force sensors 122, one or more turning sensors 124, one or motion sensors 126, one or more tilt sensors 128, and/or any combination thereof. As will be described the one or more posture sensors 120 may also provide feedback for determining particular motions (e.g., a turning motion, motion over an uneven surface, etc.) of the user and/or the wheelchair.

Figure 3A:
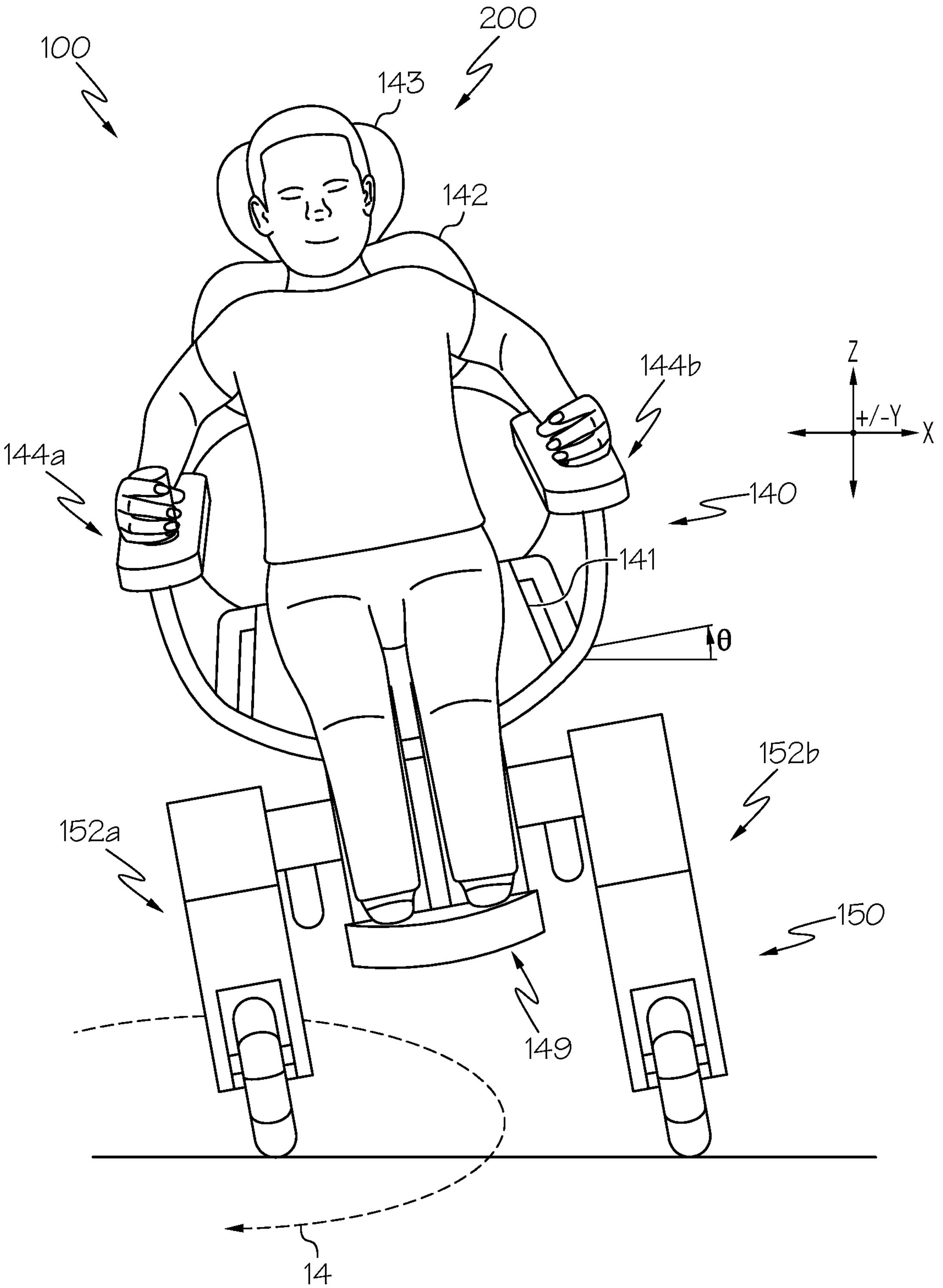
FIG. 3A depicts a front view of a wheelchair user making a turning motion, according to one or more embodiments shown and described herein.
Figure 3B:
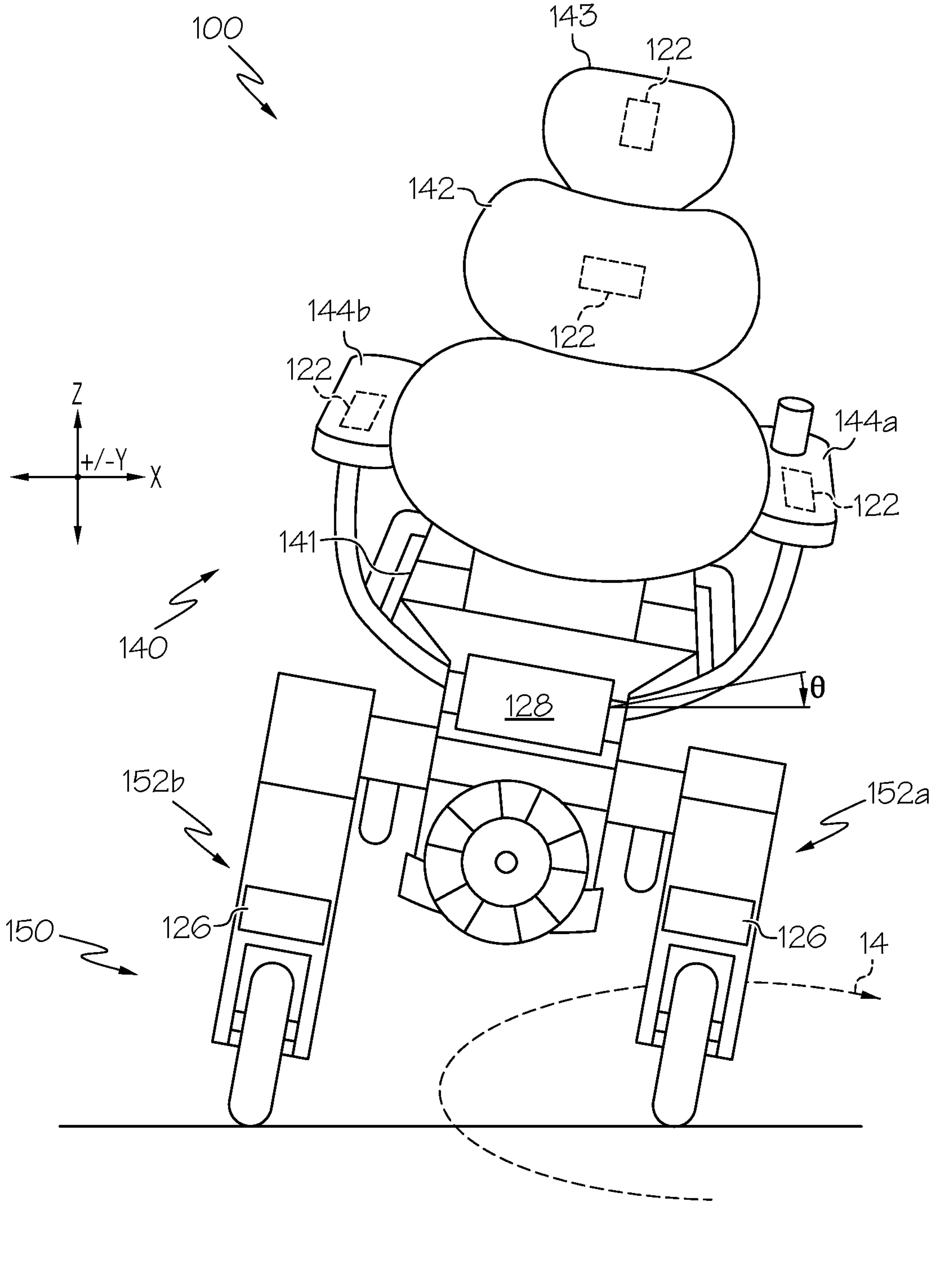
FIG. 3B depicts a back view of the wheelchair of FIG. 3A without the user, according to one or more embodiments shown and described herein.
Figure 3C:
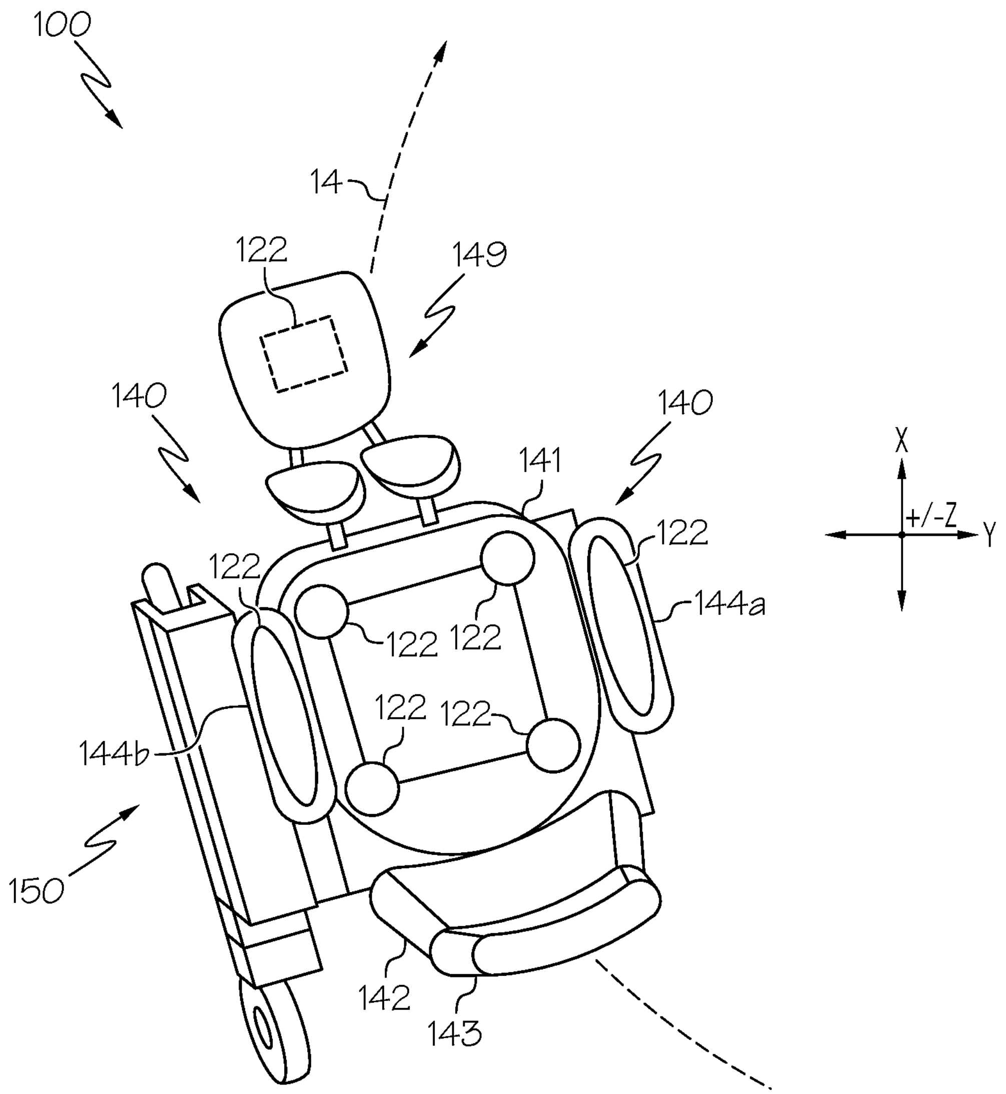
FIG. 3C depicts a top view of the wheelchair of FIG. 3A without the user, according to one or more embodiments shown and described herein.

FIGS. 3A-3C illustrate a wheelchair 100 performing a turning motion. FIG. 3A depicts a front view of the wheelchair 100 with a user 200 positioned within the seat. FIG. 3B depicts a back view of the wheelchair 100 with the user 200 removed. FIG. 3C depicts a top or aerial view of the wheelchair with the user 200 removed. Referring specifically to FIGS. 3B and 3C, the one or more force sensors 122 may be mounted to one or more of the seat portion 141 of the wheelchair 100, a headrest 143 of the wheelchair 100, arm rests of the wheelchair 100, a back support of the wheelchair 100, a lower leg and foot rest 149, or any combination thereof and output a force signal. The control unit 104 may receive the force signal of the one of the one or more force sensors 122 to determine the center of gravity of the user and/or determinate how the user is sitting in the chair (e.g., leaning forward, reclining, leaning on the left or right arm rest 144*a*, 144*b*, etc.). Accordingly, the control unit 104 may also detect changes in the user's posture or center of gravity based on the one or more force sensors 122. In embodiments, changes to the user's posture or center of gravity may cause the control unit 104 to operate the first leg actuator 171*a*, the second leg actuator 171*b*, the seat actuator 172, or any combination thereof, to adjust the user's posture or center of gravity to a preferred position (e.g., the center of the seat 140 or some other user defined preferred position).

The one or more turning sensors 124 may include any sensors which output a turning signal indicative of the wheelchair 100 performing a turning motion. For example, the one or more turning sensors 124 may include, GPS sensors, the one or more motion sensors 126, user control sensors (e.g., feedback from the joystick or other wheelchair 100 guiding device), and/or force sensors 122. For example, GPS sensors may indicate that a user is making a turning motion based on map data. The one or more motion sensors 126 may output a signal indicative of the velocity and/or angular acceleration of the wheels 156, 158 of the first and second legs and may include but are not limited to speedometers, accelerometers, gyroscopes, or the like. For example, a difference in speed or angular acceleration of the wheels 156, 158 of the first and second adjustable legs 152*a*, 152*b*, may indicate a user is making a turning motion, and may further indicate the speed at which the user is making the turning motion in the wheelchair 100. The one or more force sensors 122 (e.g., such as force sensors 122 within the headrest 143 and/or the right and left arm rests 144*a*, 144*b*) may also indicate a turning motion is occurring. For example, during turning within a wheelchair 100 a user may lean, due to centrifugal force, away from a center of curvature of a turn. Accordingly, during a turn a user's head and/or body may be pushed toward the outside of a chair during turning. Turning motions may cause changes in the user's center of gravity and/or posture within the chair making turning motions uncomfortable.

In one or more embodiments, the control unit 104 may counteract centrifugal forces acting on a user by leaning the user into the turn. Referring to FIG. 3A, the wheelchair 100 includes the user 200 sitting on the seat 140. The wheelchair 100 is traversing a turn about an arc 14. As illustrated, the control unit 104 determines the wheelchair is performing the turning motion based on the turning signal output by the one or more turning sensors 124 and automatically adjusts the first adjustable leg 152*a* with the first leg actuator 171*a* and/or the second adjustable leg 152*b* with the second leg actuator 171*b* to lean the user into the turning motion by leaning the seat 140 by an angle θ into the turn. By leaning into the turn, centrifugal forces acting on the user are reduced, thereby allowing the user's center of gravity and/or posture within the seat 140 to remain the same within and outside the turning motion, and not be forced toward an edge of the seat 140. Such may also reduce possibility of turnover when traversing a turn.

The amount the wheelchair 100 leans may be based on one or more factors including but not limited to, a predetermined leaning constant, the speed and/or acceleration of the wheelchair 100, a body morphology of the user 200, characteristics of the wheelchair 100 (e.g., height, weight, etc.), and/or one or more user preferences. For example, leaning of the wheelchair 100 may be some predetermined angular amount based on average wheelchair turn speed. In some embodiments, one or more motion sensors 126 may output a speed and/or acceleration of the wheelchair 100. Based on the speed or acceleration of the wheelchair, a lean angle may be calculated. In some embodiments, the body morphology of the user (e.g., height, weight, missing limbs, etc.) may be provided to the control unit 104, such that the lean angle is based on the particular body morphology of the user 200. In some embodiments, a user may provide preference inputs (e.g., via the one or more user interface devices 130) to define a leaning preference. For example, a user may like to prefer to feel some force of a turning and may provide preferences indicating a preferred lean amount and/or prevent leaning. In some embodiments, the lean angle may be based on a combination of the speed and/or acceleration, the body morphology of the user, and/or one or more user preferences.

Once the turning motion is completed, as determined by the control unit 104 based on the output of the one or more turning sensors 124, the control unit 104 may operate the first leg actuator 171*a*, the second leg actuator 171*b*, and/or the seat actuator 172 to return the user to the upright position and/or the preferred position.

As noted above, the wheelchair 100 may include one or more tilt sensors 128 communicatively coupled to the control unit 104 over the communication path 102. The one or more tilt sensors 128 may be mounted to the seat 140 of the wheelchair 100, for example, and may be configured to output a signal indicative of the tilt of the seat 140. Tilt sensors may include but are not limited to force-balance sensors, MEMS sensors, fluid-filled sensors, or the like. In embodiments the control unit 104 may receive the tilt signal from the one or more tilt sensors 128 and determine the amount the seat 140 of the wheelchair 100 is leaning. For example, the wheelchair 100 may calculate the tilt angle during turning and, using the one or more tilt sensors 128, detect the actual tilt angle of the wheelchair 100 to determine when the wheelchair 100 has reached to calculated tilt angle.

In some embodiments, the one or more tilt sensors 128, may also indicate the terrain over which the user is traveling. For example, the user may be traveling over uneven terrain. The control unit 104 may receive the tilt signal from the one or more tilt sensors 128, and may execute logic to adjust the angle of the seat 140 to a desired position with the one or more actuators 170. Accordingly, the tilt of the seat 140 may be dynamically adjusted as the wheelchair 100 traverses the surface to maintain the user's desired posture and/or center of gravity within the seat 140 of the wheelchair 100.

As noted above, the posture signal of the one or more posture sensors 120 (e.g., the one or more force sensors 122) may allow the control unit 104 to detect changes in the posture of the user. In response to changes in the posture of the user, the control unit 104 may automatically adjust the position of the seat 140 with the first leg actuator 171*a*, the second leg actuator 171*b*, and/or the seat actuator 172.

It is noted that the speed and/or acceleration (or deceleration) of the wheelchair 100 may also affect a user's posture and/or center of gravity. Accordingly, in some embodiments, the one or more motion sensors 126 may be configured to output an acceleration and/or speed signal indicative of the acceleration and/or speed of the wheelchair. Based on the speed or acceleration signal, the control unit 104 may determine a speed or acceleration of the wheelchair 100. In some embodiments, the control unit may the tilt angle of the seat 140 (e.g., with the first leg actuator 171*a*, the second leg actuator 171*b*, and/or the seat actuator 172) may be based on the speed or acceleration of the wheelchair 100. For example, when accelerating a user may be pushed back in the seat 140. Accordingly, by leaning the user forward, the posture and/or center of gravity of the user may be maintained. Similarly, when decelerating, the posture and/or center of gravity of the user may move forward. Accordingly, by leaning the user backward, the posture and/or center of gravity of the user within the seat 140 may be maintained. That is, leaning of the seat 140 may reduce effects that acceleration and/or deceleration may have on a user's posture.

As noted herein, user information, preference information, or the like may be communicated to control unit 104 using the one or more user interface devices 130. That is the one or more user interface devices 130 may be communicatively coupled to the control unit 104 over the communication path 102. The one or more user interface devices 130 may include any combinations of joysticks, knobs, buttons, touchscreens, keyboards, microphones, or the like, which allow the user 200 to interact with the control unit 104. As noted above, the user 200 may indicate via the one or more user interface devices 130 one or more preferences (e.g., posture preferences, leaning preferences, or the like) which may be used in determining an amount of tilt angle adjustment of the seat 140 during motion of the wheelchair 100 (e.g., turning). In some embodiments, the user may provide information regarding the user's body morphology (e.g., weight, height, missing limbs, etc.) to allow the control unit 104 to tune calculations to the user's particular body characteristics. Accordingly, the control unit 104 may receive the one or more user preferences and/or characteristic information from the one or more user interface devices 130 and tailor the adjustment of the tilt angle of the seat 140 based on the user preference and or user characteristic information.

Figure 4:
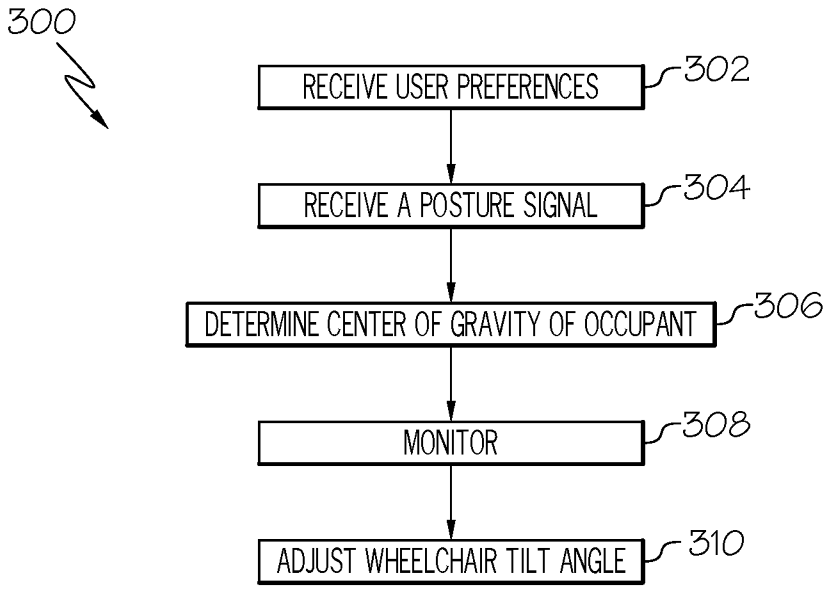
FIG. 4 depicts a flowchart illustrating a method of adjusting and/or maintaining a user's center of gravity within a wheelchair, according to one or more embodiments shown and described herein.

Referring now to FIG. 4, a flow chart illustrating a method 300 for maintaining a user's center of gravity at a predetermined position is depicted. It is noted that while a number of steps are shown, a fewer or greater number of steps, in any order, may be included.

At block 302, the method 300 may include receiving, with the one or more user interface devices 130 the user preference information. For example, and as described above, user preference information may include, but is not limited to, leaning preferences, posture preferences, or the like. In some embodiments, user preference information may also include user characteristic information, such as body morphology information. In some embodiments, methods may not include receiving user preferences.

At block 304 the method 300 includes receiving a posture signal from the one or more posture sensors 120. That is, the control unit 104 receives the posture signals from the one or more posture sensors 120 and may determine, for example, a center of gravity of the user, particular posture characteristics (e.g., leaning on an armrest, reclining, leaning forward, etc.), or the like, at block 306. Furthermore, the method 300 may include monitoring the user for changes in the user's center of gravity or posture at block 308. Based changes to user's center of gravity or other posture characteristics, the method at block 310 may include automatically adjusting a tilt angle of the seat 140 of the wheelchair 100 to maintain the user's posture within the wheelchair. For example, the tilt angle of the seat 140 may be adjusted by actuating the first leg actuator 171*a*, the second adjustable leg actuator 171*b*, and or the seat actuator 172 to maintain the center of gravity of the user at a predetermined position (e.g., within the center of the seat or some desired position as indicated by the user). Accordingly, the control unit 104 may dynamically respond to changes e.g., caused by turning, acceleration, deceleration, traversing uneven surfaces, or the like) to maintain the user in the predetermined position. For example, in some embodiments, the method may include detecting motions or determining motions such as a turning motion, based on the output of the one or more turning sensors 124, acceleration and/or deceleration, based on the output based on one or more motion sensors, or traveling over uneven surfaces, based on the one or more tilt sensors, and dynamically adjusting the tilt angle of the seat 140, with the one or more actuators 170, based on the detected motion of the wheelchair 100, such that the user's center of gravity, and/or posture, may be maintained throughout the motion.

It should now be understood that embodiments of the present disclosure are directed to wheelchairs and methods for adjusting and/or maintaining a user's center of gravity in the wheelchair. For example, when a wheelchair is making a turning motion, centrifugal forces may act on a user's body to shift the user's center of gravity into an uncomfortable position. The shifting of a user's center of gravity may also result in overturning of the wheelchair. Traveling over rough and/or uneven terrain may cause similar shifting of the user's center of gravity. The present embodiments are configured to detect the user's shifting center of gravity and/or detect a turning motion of the wheelchair and automatically adjust the angle of the seat of the wheelchair to prevent and/or limit shifting of the user's center of gravity. Moreover, where a user desires his or her center of gravity is elsewhere than the center of the seat (e.g., leaning forward, reclining, leaning to one side or the other, etc., the wheelchair may maintain the user's desired center of gravity positioning.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheelchair comprising:

a seat, a first adjustable leg coupled to a first side of the seat, the first adjustable leg comprising a first leg actuator configured to extend and retract the first adjustable leg;

a second adjustable leg coupled to a second side of the seat, the second adjustable leg comprising a second leg actuator configured to extend and retract the second adjustable leg;

one or more turning sensors configured to output a turning signal indicative of the wheelchair performing a turning motion; and a control unit operable to:

determine the wheelchair is performing the turning motion based on the turning signal output by the one or more turning sensors; and automatically adjust a tilt angle of the seat with the first leg actuator and the second leg actuator to lean a user of the wheelchair into the turning motion.

2. The wheelchair of claim 1, further comprising a user interface device communicatively coupled to the control unit, wherein:

the control unit is configured to receive one or more user preferences with the user interface device; and the tilt angle of the seat during turning is based on the one or more user preferences.

3. The wheelchair of claim 1, further comprising a user interface device communicatively coupled to the control unit, wherein:

the control unit is configured to receive user characteristic information from the user interface device; and the tilt angle of the seat during turning is based on the user characteristic information.

4. The wheelchair of claim 1, wherein the one or more turning sensors comprise one or more motion sensors communicatively coupled to the control unit, wherein:

the control unit is operable to determine a speed of the wheelchair based on a speed signal of the one or more motion sensors; and the tilt angle of the seat during turning is based on the speed of the wheelchair.

5. The wheelchair of claim 1, wherein the one or more turning sensors comprise one or more motion sensors communicatively coupled to the control unit, wherein:

the control unit is operable to determine an acceleration of the wheelchair based on an acceleration signal of the one or more motion sensors; and the tilt angle of the seat during turning is based on the acceleration of the wheelchair.

6. The wheelchair of claim 1, wherein the one or more turning sensors comprise one or more force sensors.

7. The wheelchair of claim 6, wherein the one or more force sensors are mounted to one or more of a seat portion of the wheelchair, a headrest of the wheelchair, arm rests of the wheelchair, a back support of the wheelchair, or any combination thereof.

8. A wheelchair comprising:

a seat, a first adjustable leg coupled to a first side of the seat, the first adjustable leg comprising a first leg actuator configured to extend and retract the first adjustable leg;

a second adjustable leg coupled to a second side of the seat, the second adjustable leg comprising a second leg actuator configured to extend and retract the second adjustable leg;

one or more user posture sensors configured to output a posture signal indicative of a posture of a user positioned on the seat;

one or more motion sensors and/or a turning sensor; and a control unit configured to:

determine a location of a center of gravity of the user based on the posture signal output by the one or more user posture sensors;

determine a speed of the wheelchair and/or a turning motion of the wheelchair based on an output from the one or more motion sensors and/or the turning sensor; and automatically adjust a tilt angle of the seat with the first leg actuator and the second adjustable leg actuator to maintain the center of gravity of the user at a predetermined position, wherein adjusting the tilt angle is based on the speed of the wheelchair and/or the turning motion of the wheelchair.

9. The wheelchair of claim 8, further comprising a user interface device communicatively coupled to the control unit, wherein:

the control unit is configured to receive one or more user preferences with the user interface device; and the tilt angle of the seat is based on at the one or more user preferences.

10. The wheelchair of claim 8, further comprising a user interface device communicatively coupled to the control unit, wherein:

the control unit is configured to receive user characteristic information from the user interface device; and the tilt angle of the seat is based on the user characteristic information.

11. The wheelchair of claim 8, wherein the one or more posture sensors comprise one or more motion sensors, wherein:

the tilt angle of the seat is based on the speed of the wheelchair.

12. The wheelchair of claim 8, wherein:

the control unit is operable to determine an acceleration of the wheelchair based on an acceleration signal of the one or more motion sensors; and the tilt angle of the seat is based on the acceleration of the wheelchair.

13. The wheelchair of claim 8, wherein the one or more user posture sensors comprise one or more force sensors, wherein the control unit is operable to determine the location of the center of gravity of the user based on a force signal of the one or more force sensors.

14. A method for maintaining a wheelchair user's center of gravity at a predetermined position, the method comprising:

receiving, with a control unit, a posture signal from one or more posture sensors, the posture signal being indicative of a posture of a user positioned on a seat of a wheelchair;

receiving, with a control unit, an output from one or more motion sensors and/or a turning sensor;

determining, with the control unit, a location of a center of gravity of the user based on the posture signal;

determining, with the control unit, a speed of the wheelchair and/or a turning motion of the wheelchair based on the output; and adjusting, automatically with the control unit, one or more actuators to adjust a tilt angle of the seat to maintain the center of gravity of the user at the predetermined position, wherein adjusting the tilt angle is based on the speed of the wheelchair and/or the turning motion of the wheelchair.

15. The method of claim 14, wherein adjusting the tilt angle of the seat occurs in response to determining the turning motion of the wheelchair.

16. The method of claim 14, further comprising receiving, with the control unit, one or more user preferences from one or more user interface devices, the one or more user preferences comprising at least a leaning preference, wherein the adjusting the tilt angle of the seat is based on at least the leaning preference.

17. The method of claim 14, further comprising receiving, with the control unit, user characteristic information from one or more user interface devices, wherein the adjusting the tilt angle of the seat occurs is based on the user characteristic information.

18. The method of claim 14, wherein adjusting the tilt angle of the seat is based on the speed of the wheelchair.

19. The method of claim 14, further comprising:

receiving, with the control unit, an acceleration signal from the one or more motion sensors; and determining an acceleration of the wheelchair based on the acceleration signal, wherein adjusting the tilt angle of the seat is based on the acceleration of the wheelchair.

20. The method of claim 14, wherein the one or more actuators comprise a first leg actuator, a second leg actuator, a seat actuator, or any combination thereof.

* * * * *